United States Patent [19]
Miessen et al.

[11] Patent Number: 5,115,564
[45] Date of Patent: May 26, 1992

[54] METHOD FOR FRACTURING CONNECTING RODS

[75] Inventors: Walter Miessen, Aalen; Nikolaus Fauser, Jagstzell; Michael Hähnel, Aalen-Nesslau, all of Fed. Rep. of Germany

[73] Assignee: Alfing Kessler Sondermaschinen GmbH, Fed. Rep. of Germany

[21] Appl. No.: 521,108

[22] Filed: May 9, 1990

[30] Foreign Application Priority Data

May 10, 1989 [EP] European Pat. Off. ........ 89108419.6

[51] Int. Cl.⁵ .............................................. B23P 17/00
[52] U.S. Cl. ..................... 29/888.09; 29/88.011; 29/402.03; 29/412
[58] Field of Search ............... 29/888.09, 888.091, 29/888.092, 888.011, 402.03, 411, 412, 413, 414, 415, 416, 426.5, 426.4; 74/579 R, 579 E; 225/103, 96.5, 93.5

[56] References Cited

U.S. PATENT DOCUMENTS

| | | | |
|---|---|---|---|
| 3,994,054 | 11/1976 | Cuddon-Fletcher | 74/579 E |
| 4,569,109 | 2/1986 | Fetouh | 74/579 E |
| 4,693,139 | 9/1987 | Mukai et al. | 74/579 E |
| 4,754,906 | 7/1988 | Brovold | 74/579 E |
| 4,768,694 | 9/1988 | Fabris et al. | 29/888.09 |
| 4,802,269 | 2/1989 | Mukai et al. | 74/579 E |
| 4,827,795 | 5/1989 | Machida et al. | 74/579 E |
| 4,860,419 | 8/1989 | Hekman | 29/888.09 |
| 4,936,163 | 6/1990 | Hoag et al. | 29/888.09 |
| 4,970,783 | 11/1990 | Olaniran et al. | 29/888.09 |

OTHER PUBLICATIONS

"Connecting Rods Are Cracked to Perfection" Machine Design, Mar. 10, 1988 pp. 66-67.

Primary Examiner—Irene Cuda
Attorney, Agent, or Firm—Brooks, Haidt, Haffner & Delahunty

[57] ABSTRACT

A method for fracturing the cap and shaft of connecting rods manufactured by powder forging in which the cap or the shaft of the connecting rod is fixed on a support movable perpendicularly to the plane of fracture, the portion of the connecting rod not fixed on the support is held stationarily, and a straight central impact acting in the axis of symmetry of the connecting rod is applied to the support in the direction of fracture.

22 Claims, 3 Drawing Sheets

METHOD FOR FRACTURING CONNECTING RODS

The present invention relates to a method and an apparatus for fracturing cap and shaft of connecting rods manufactured by powder forging.

Known methods for fracturing the cap and shaft of connecting rods are based in principle on the method of causing an "expanding force" to act on the inner surface of the large eye of the connecting rod by means of special devices, and increasing it until the breaking point of the connecting rod material is reached and the cap and shaft are separated by fracture (principle: cf. FIG. 6 of U.S. Pat. No. 4,569,109).

In order to be able to carry out the fracture at a precisely preset point, on the inner surface of the large eye and partly also on the outer surface thereof are provided notches, the notch effect of which predetermines progress of the fracture (cf. U.S. Pat. Nos. 4,569,109 and 4,693,139).

Figure 3:
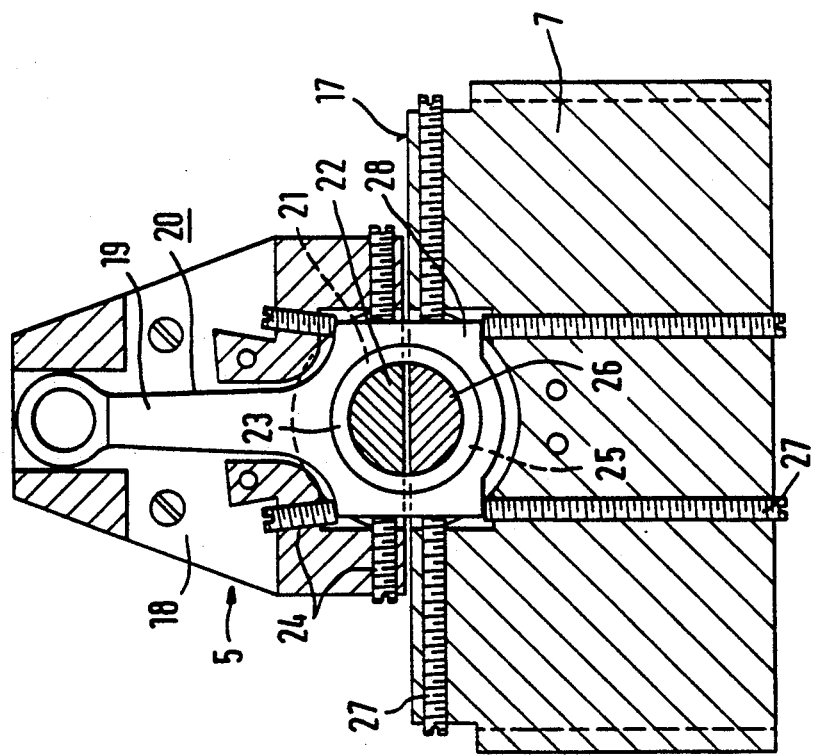

Fracturing methods are also known in which in the desired plane of fracture in the connecting rod are provided holes through which the forces required for fracture are introduced into the connecting rod material by "expander mandrels" (cf. FIG. 3 of U.S. Pat. No. 3,994,054).

As mechanical fracturing methods of this kind are particularly unsuitable for mass production, inter alia because of the unfavourable frictional conditions, methods have already been developed in which the expanding force is generated hydraulically (cf. U.S. Pat. No. 4,754,906). Methods of this kind are, however, technically very elaborate because of the high-pressure hydraulics required, and they do not yield optimum fracture results.

It is the object of the present invention to provide a completely novel method for the fracture of connecting rod, which comprises a simple construction and yields improved fracture results.

This object is achieved according to the invention by a method which is characterised in that the cap or the shaft of the connecting rod is fixed on a support movable perpendicular to the plane of fracture, that the portion of the connecting rod not fixed on the support is held stationarily, and that a straight central impact acting in the axis of symmetry of the connecting rod is applied to the support in the direction of fracture.

The object is further achieved by another method which is characterised in that the cap and the shaft of the connecting rod are each fixed on a support movable perpendicularly to the plane of fracture, and that a straight central impact acting in the axis of symmetry of the connecting rod in the direction of moving apart, is applied to each support.

The invention is based on the concept that optimum fracture results are always obtained if firstly the fracturing force can act suddenly and secondly during this process the connecting rod is mounted rigidly and without play. It is precisely the sudden introduction of the fracturing force that is not possible with known methods and apparatuses, because with the known a certain length of time is always necessary to build up the fracturing force.

Particularly good fracture results are obtained if the support or supports are prestressed in the direction of impact to a value below the yield point of the connecting rod material and only in the prestressed state is a straight central impact applied.

Tests have shown that particularly good results are obtained if the prestressing force is equal to or less than 80% of the fracturing force.

Basically the supports can be mounted in the most varied ways. Particularly good results are obtained if the supports are mounted for rectilinear movement parallel to the axis of symmetry of the connecting rod.

Tests have shown that the cap and shaft of the connecting rod fit together in the region of the fracture surface particularly closely, without a gap and precisely, if immediately after the fracturing operation the cap and the shaft are pressed against each other at high contact pressure in the region of the plane of fracture.

Particularly well-fitting results are obtained if the contact pressure corresponds to the clamping force with which the cap and the shaft are pressed together by the connecting rod bolts during subsequent use of the connecting rod.

In order to obtain optimum fracture results, the straight central impact must be precisely adapted to the connecting rod material used at any given time, the shape and size of the fracture cross-sectional area and the respective arrangement of measures affecting progress of the fracture (e.g. the notches, etc.). This is done by simple tests by which the weights and speeds affecting the central straight impact are varied according to the respective circumstances.

One preferred apparatus for carrying out the aforementioned methods includes the following components:
a stationary base,
a holder for the connecting rod portion held stationarily, which is mounted rigidly on the base,
a support for the connecting rod portion not held stationarily, which is mounted in a guide fixed to the base for movement perpendicularly to the plane of fracture and parallel to the axis of symmetry of the connecting rod within limits, and
an impact mass which applies to the support in the direction of fracture of the connecting rod a straight central impact operative in the axis of symmetry of the connecting rod.

Another apparatus for carrying out the above methods includes the following components:
a stationary base,
a support for the cap of the connecting rod,
a support for the shaft of the connecting rod,
a guide fixed to the base for each support, on which the respective support is mounted for movement in each case perpendicularly to the plane of fracture and parallel to the axis of symmetry of the connecting rod within limits, and
an impact mass for each support, wherein the impact masses simultaneously apply to the respective support in the direction of fracture of the connecting rod a straight central impact operative in the axis of symmetry thereof.

A particularly simple technical construction is achieved in the apparatus for carrying out the above first mentioned method in that the stationary base is arranged vertically and the impact mass is designed as a gravity-driven impact weight. In this way no special drive is required for the impact weight. Only an ordinary lifting device has to be provided, with which the impact weight is returned to its raised starting position.

The stationary base may however be arranged horizontally. In such a case, a power drive is required for the impact mass or the impact weights. A particularly simple construction is provided if the power drive is designed as a hydraulic or pneumatically operated accelerating cylinder for the impact weights.

With a vertical arrangement, if necessary in addition a hydraulic or pneumatic accelerating cylinder may be provided to accelerate the gravity-driven impact weight and in this way the gravity drive may be assisted.

Basically, the stationary base can be designed in any way. A particularly simple construction is provided if the base is designed as a base plate. With a vertical arrangement it is advantageous to incorporate the base plate into a stand assembly.

The impact mass or masses can be mounted or guided in the most varied ways. It is advantageous if the impact mass or masses are mounted for rectilinear reciprocating movement on a guide fixed to the base.

As already mentioned, for an optimum fracture result it is necessary for the connecting rods to be supported or mounted rigidly and without play during the fracturing operation. This is achieved according to a preferred embodiment of the apparatus according to the invention by the fact that the support and the holder each comprise a holding bolt of circular cross-section which extends through the large bore of the connecting rod and fits close to the bore wall. The parting line between the two bolts lies exactly in the plane of fracture.

It is advantageous if the support is designed as a carriage on which the holding bolt is mounted. The mounting here should be designed so that the holding bolt cannot bend during fracturing. This is achieved in particular if each holding bolt in the region of its free end is supported in the direction of loading via a removable clamp on the carriage or holder.

For mounting the connecting rod as free from play as possible and as rigidly as possible for the fracturing operation it is advantageous that the cap and/or the shaft of the connecting rod in each case can be fixed in the holder and support by fixing and locating elements and pressed into contact with the outer surfaces of the holding bolts. The fixing and locating elements can in this case be designed as normal clamping screws which act on the cap and shaft of the connecting rod from three sides. The fixing and locating elements may however also be operated mechanically or hydraulically.

Basically, the impact masses can be designed in any way. A particularly advantageous arrangement is however provided if the impact masses are each designed after the fashion of a yoke and provided with two impact surfaces which cooperate with counterimpact surfaces on the carriage which are arranged on both sides of the holding bolts and hence on both sides of the connecting rod on the carriage. In this way the impact force of the respective impact mass is introduced into the carriage in such a way that a fracturing force located precisely in the connecting rod axis results therefrom.

As already mentioned, particularly advantageous fracture results are obtained if the support or supports are prestressed in the direction of impact. According to a preferred embodiment, for this the apparatus is provided with a prestressing cylinder which is fixed to the base and which with its piston rod engages the support or carriage.

In order to brake the mass of the support or carriage after fracturing has taken place, it is advantageous if in each case one or more damping cylinders are arranged in the path of movement of the support.

As already mentioned in connection with the method according to the invention, the straight central impact acting on the support must be precisely adapted to the connecting rod material used at any given time, the shape and size of the fracture cross-sectional area and the respective arrangement of measures affecting progress of the fracture (e.g. the notches, etc.). This is done by simple tests by varying the weight of the impact mass (if necessary by varying the weight of the supports too), and by varying the speed of the impact mass. With a vertical arrangement of the stationary base, the speed of the impact mass can be varied by altering the fall height, assisted by the accelerating cylinder if required. With a horizontal arrangement, this is done by suitably adjusting the accelerating cylinder.

Below for further illustration and better understanding an embodiment of an apparatus for carrying out the method is described in more detail with reference to the attached drawings.

Figure 1:
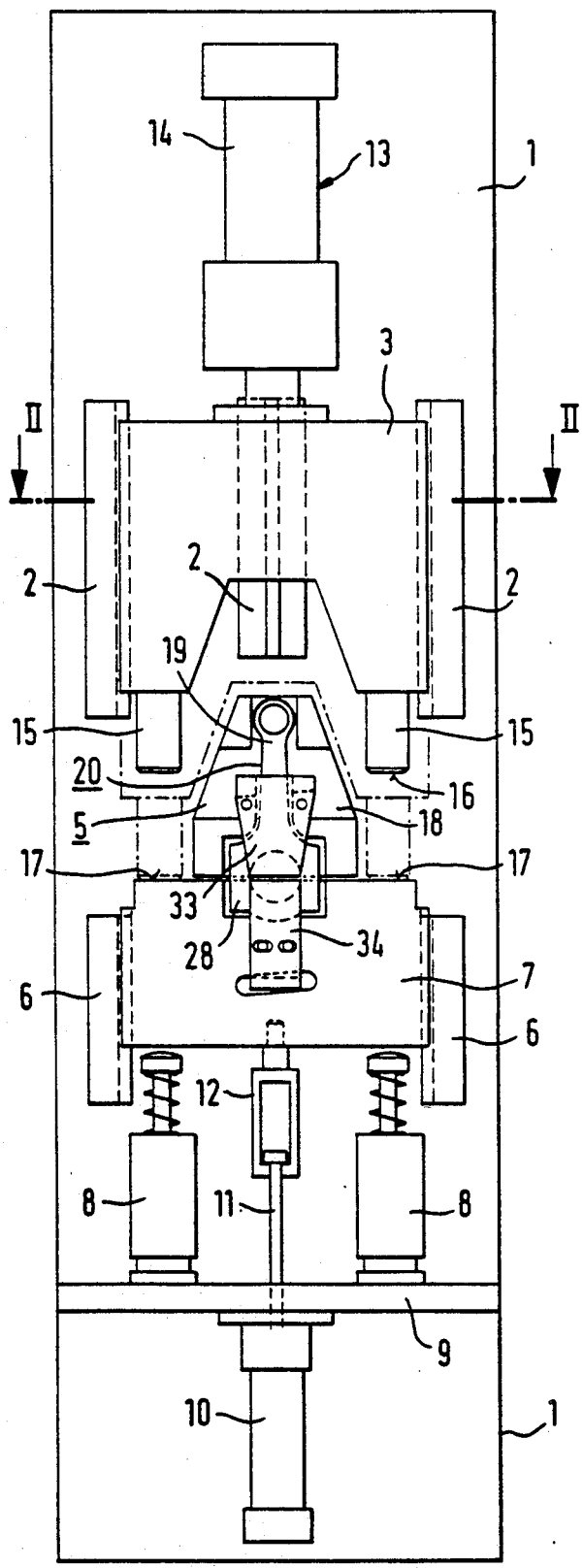
Figure 2:
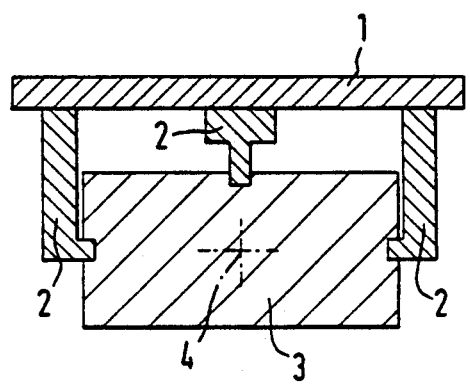
Figure 4:
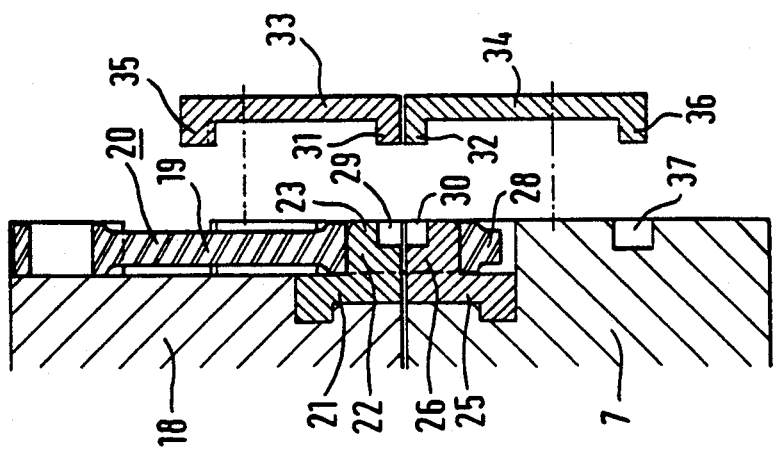
Figure 5:
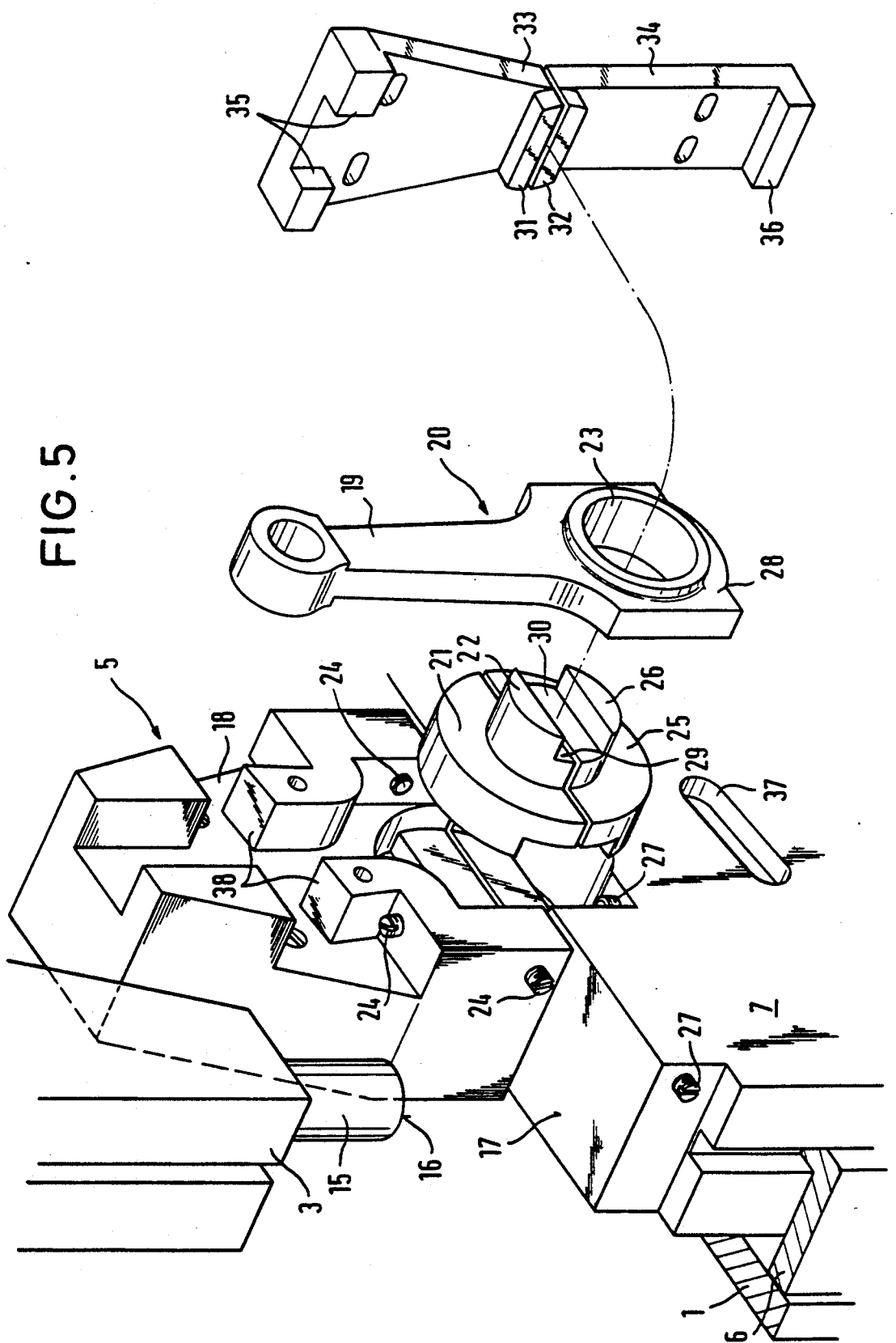

FIG. 1 shows schematically an overall view of the apparatus according to the invention, FIG. 2 shows a section in plane II—II of FIG. 1, FIG. 3 shows schematically on an enlarged scale a detail of FIG. 1, FIG. 4 shows a side view of the detail according to FIG. 3 in a partial exploded view, and FIG. 5 shows schematically in a perspective view, also exploded, details of the assembly according to FIGS. 3 and 4.

As shown by FIGS. 1 and 2, the apparatus consists of a base 1 which in the present embodiment is designed as a base plate. On the base plate 1 are disposed guide rails 2 by which an impact mass 3 in the form of a yoke-like impact weight is mounted for reciprocating movement in an axis 4.

Adjoining the guide rails 2 on the base 1 is rigidly mounted a holder 5 approximately adapted to the yoke shape of the impact mass 3. On the side of the holder 5 opposite the impact mass, on the base 1 are fixed guide rails 6 by which a support 7 is mounted for reciprocating movement in the direction of the axis 4.

In the path of movement of the support 7, on the side opposite the holder 5 are provided two damping cylinders 8 which are fixed to a plate 9 which is connected to the base 1. The plate 9 carries on the side opposite the damping cylinders 8 a prestressing cylinder 10 the piston 11 of which extends through the plate 9 and is connected by a lock 12 to the support 7.

On the side opposite the holder 5, the impact mass 3 is provided with an element 13. With a horizontal arrangement of the base 1, this element 13 is an accelerating cylinder 14 with which the impact mass 3 is accelerated in the direction of the support 7 for the fracturing operation.

With a vertical arrangement of the base 1, i.e. in an apparatus in which the impact mass 3 is designed as a gravity-driven impact weight, the element 13 consists of a lifting cylinder with which the impact mass 3 after performing the fracturing operation can be lifted back to its raised position and held there. In this version the lifting cylinder is provided with a latch arrangement, not shown, with which the impact mass 3 can be released in the raised position to perform the impact fracturing operation.

The impact mass 3 is designed like a yoke in the present case and has on its side facing towards the support 7, on both sides of the holder 5, impact bolts 15 the impact surfaces 16 of which coact with counterimpact surfaces 17 on the upper side of the support 7, as indicated in dot-dash lines in FIG. 1.

The construction of the holder 5 and support 7 is shown schematically in FIGS. 3 to 5. The holder 5 consists of a rigid moulding 18 which is rigidly connected to the base 1 designed as a base plate. This moulding 18 has recesses adapted to the shaft 19 of the connecting rod 20. In the moulding 18 is also rigidly inserted a holding bolt 21, of which the neck 22 has the diameter of the large eye 23 of the connecting rod 20. As shown by FIGS. 3 and 5, both the holding bolt 21 and the neck 22 have a semicircular cross-section.

The moulding 18 also has four threaded holes in which bolts are disposed. These bolts constitute fixing and locating elements 24 for the shaft 19 of the connecting rod 20, which firstly support the shaft 19 rigidly in the moulding 18 and hence in the holder 5 and secondly press it without play against the neck 22 of the holding bolt 21 of the holder 5.

As already mentioned in connection with FIG. 1, the support 7 is designed as a carriage which is mounted for reciprocating movement in the axis 4 via the guide rails 6 (cf. FIG. 2). The carriage is also provided with a holding bolt 25 which comprises a neck 26. The holding bolt 25 and the neck 26 also have a semicircular cross-section and complement the holding bolt 21 and neck 22 of the holder 5 to form an arrangement which almost completely fills the large eye 23 of the connecting rod 20. The parting plane between holding bolt 21 and holding bolt 25 lies exactly in the fracture plane of the apparatus.

On both sides of the holding bolt 25, the support 7 designed after the fashion of a carriage is provided in the region of its upper side with the counterimpact surfaces 17 already mentioned in connection with the description of FIG. 1, for the impact surfaces 16 of the impact bolts 15 of the impact mass 3.

The carriage also has four threaded holes in which are disposed bolts which serve as fixing and locating elements 27 for the cap 28 of the connecting rod 20. By these fixing and locating elements 27, the cap 28 of the connecting rod is clamped rigidly in the carriage and pressed against the neck 26 of the holding bolt 25.

In order to prevent the holding bolts 21 and 25 from bending during the fracturing operation, in the region of the free end of both neck 22 and neck 26 is provided a groove 29 or 30 in which engage the ends 31 or 32 of a clamp 33 or 34 which in each case rests with its other end 35 or 36 in a groove 37 or on projections 38 (cf. FIGS. 4 and 5).

As can be seen from FIG. 5, both the groove 37 and the projections 38 are inclined relative to the fracture plane, whereby the clamps 33 or 34 can be applied without play by sliding in a transverse direction, prestressed and then bolted to the moulding 5 or the support 7. In this way the necks 22 and 26 are prevented from bending during the fracturing operation, as the free ends of the necks 22 and 26 are supported directly by the clamps 33 and 34 on the moulding 18 and the support 7.

As can be seen from FIG. 5, the holding bolts 21 and 25 in each case constitute components which can be manufactured separately and which are rigidly anchored in a corresponding recess in the moulding 18 or in the support 7.

The fracturing operation proceeds as follows:

First the impact mass 3 is moved to its retracted position by the element 13, as shown in FIG. 1.

Next the support 7 is displaced in the direction of the holder 5 and the connecting rod 20 is placed over the necks 22 and 26. Then the clamps 33 and 34 are applied and prestressed by lateral displacement and bolted to the moulding or the support 7. Next the fixing and locating elements 24 and 27 are tightened, so that the connecting rod 20 is clamped rigidly both in the holder 5 and in the support 7.

With a vertical arrangement of the base, the latch assembly described above is then released, so that the impact mass 3 can drop down under the influence of gravity and, with the impact surfaces 16 of the impact bolts 15, strike the counterimpact surfaces 17 of the support 7. Thus an impact force by which the fracturing operation is accomplished is introduced exactly at the centre of the axis 4 which lies in the longitudinal axis of the connecting rod 20. At this stage the support 7 is accelerated and this movement is stopped by the damping cylinders 8.

If the support 7 is to be prestressed before the fracturing operation, the prestressing cylinder 10 is acted upon, and by means of the piston rod 11 and the lock 12 the support 7 is pulled in a direction away from the holder 5.

With a horizontal arrangement of the base the impact mass 3 is accelerated by the accelerating cylinder 14. Otherwise the fracturing operation proceeds in the manner already described.

After completion of the fracturing operation, the impact mass 3 is returned to its starting position and the load on the prestressing cylinder 10 is relieved. The the clamps 33 and 34 are unbolted and the shaft 19 and cap 28 are removed from the apparatus. The apparatus is then free for another fracturing operation.

To improve the precision of fitting, the cap and shaft are then, as already described above, pressed against each other again at high contact pressure in a further operation.

What is claimed is:

1. A method for fracture separating into first and second parts a powder forged workpiece having an opening therethrough along a diametral plane with respect to said opening, comprising in combination the steps of fixing that part of said workpiece that is on one side of said diametral plane to a stationary support, fixing the remainder of said workpiece to a support that is moveable away from said fixed support along a straight line normal to said diametral plane, and striking said moveable support with an impacting mass imparting sudden movement to said moveable support away from said stationary support to thereby fracture said workpiece into said first and second parts.

2. A method according to claim 1, wherein a prestressing force is applied to said moveable support urging said moveable support awafy from said stationary support to stress said workpiece to a value below the yield point of the material of said workpiece.

3. A method according to claim 2, wherein said prestressing force is no greater than 80% of the force required to fracture said workpiece.

4. A method according to claim 1, wherein used is made of a workpiece in the form of a connecting rod blank with a circular opening therethrough, and said first and second parts are the cap and body of the connecting rod.

5. A method according to claim 4, wherein said supports are provided with respective mating hemi-cylindrical members that fit closely within said circular opening positioned to be respectively on opposite sides of said diametral plane.

6. A method according to claim 5, wherein a prestressing force is applied to said moveable support urging said moveable support away from said stationary support to stress said workpiece to a valuee below the yield point of the material of said workpiece.

7. A method according to claim 6, wherein said prestressing force is no greater than 80% of the force required to fracture said workpiece.

8. A method according to claim 5, comprising the further step subsequent to the fracture separating step of urging said cap and body parts back together again into forceful engagement along said diametral plane.

9. A method according to claim 8, wherein a prestressing force is applied to saidd moveable support urging said moveable support away from said stationary support to stress said workpiece to a value below the yield point of the material of said workpiece.

10. A method according to claim 9, wherein said prestressing force is no greater than 80% of the force required to fracture said workpiece.

11. A method according to claim 9, wherein said forceful engagement is accomplished by applying a force substantially equal to the clamping force recommended for use when said connecting rod is placed in use.

12. A method according to claim 4, comprising the furtherr step subsequent to the fracture separating step of urging said cap and body parts back together again into forceful engagement along said diametral plane.

13. A method according to claim 12, wherein said forceful engagement is accomplished by applying a force substantially equal to the clamping force recommended for use when said connecting rod is placed in use.

14. A method according to claim 13, wherein said supports are provided with respective mating hemi-cylindrical members that fit closely within said circular opening positioned to be respectively on opposite sides of said diametral plane.

15. A method according to claim 4, wherein a prestressing force is applied to said moveawble support urging said moveable support away from said stationary support to stress said workpiece to a value below the yield point of the material of said workpiece.

16. A method according to claim 15, wherein said prestressing froce is no greater than 80% of the force required to fracture said workpiece.

17. A method according to claim 16, comprising the further step subsequent to the fracture separating step of urging said cap and body parts back together again into forceful engangement along said diametral plane.

18. A method according to claim 17, wherein said forceful engagement is accomplished by applying a force substawntially equal to the clamping force recommended for use when said connecting rod is placed in use.

19. A method according to claim 18, wherein said supports are provided with respective mating hemi-cylindrical members that fit closely within said circular opening positioned to be respectively on opposite sides of said diametral plane.

20. A method according to claim 15, comprising the further step subsequent to the fracture separating step of urging said cap and body parts back together again into forceful engagement along said diametral plane.

21. A method according to claim 20, wherein said forceful engagement is accomplished by applying a force substantially equal to the clamping force recommended for use when said connecting rod is placed in use.

22. A method according to claim 1, wherein the magnitude of said mass and the velocity thereof at moment of impact with said moveable support is selected to obtain a satisfactory impact force related to the physical parameters of said workpiece.

* * * * *